(12) United States Patent
Nakajima et al.

(10) Patent No.: US 7,811,716 B2
(45) Date of Patent: Oct. 12, 2010

(54) FUEL CELL

(75) Inventors: Yasushi Nakajima, Kawasaki (JP); Keiko Kushibiki, Fujisawa (JP); Itaru Shibata, Kamakura (JP); Fuminori Satou, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1076 days.

(21) Appl. No.: 10/520,081

(22) PCT Filed: Dec. 16, 2003

(86) PCT No.: PCT/JP03/16094

§ 371 (c)(1),
(2), (4) Date: Jan. 5, 2005

(87) PCT Pub. No.: WO2004/059771

PCT Pub. Date: Jul. 15, 2004

(65) Prior Publication Data

US 2006/0024534 A1    Feb. 2, 2006

(30) Foreign Application Priority Data

Dec. 25, 2002    (JP) .............................. 2002-374452

(51) Int. Cl.
H01M 8/10    (2006.01)
(52) U.S. Cl. ...................... 429/463; 429/465
(58) Field of Classification Search ................. None
See application file for complete search history.

(56) References Cited

U.S. PATENT DOCUMENTS

| 3,861,959 | A | | 1/1975 | Cadiou |
| 5,116,696 | A | | 5/1992 | Barp |
| 5,645,626 | A | * | 7/1997 | Edlund et al. .................. 95/56 |
| 5,681,373 | A | | 10/1997 | Taylor et al. |
| 5,712,220 | A | | 1/1998 | Carolan et al. |
| 5,817,597 | A | | 10/1998 | Carolan et al. |
| 6,344,290 | B1 | | 2/2002 | Bossel |
| 6,368,740 | B1 | * | 4/2002 | Dristy ......................... 429/35 |

FOREIGN PATENT DOCUMENTS

| EP | 0 437 175 A1 | 7/1991 |
| EP | 0 722 193 A1 | 7/1996 |
| JP | 8-276112 A | 10/1996 |
| JP | 2002-8681 A | 1/2002 |
| JP | 2002-505512 A | 2/2002 |
| WO | WO 99/44254 A1 | 9/1999 |

* cited by examiner

Primary Examiner—Robert Hodge
(74) Attorney, Agent, or Firm—Foley & Lardner LLP

(57) ABSTRACT

A fuel cell comprises: a cell plate (11; 110; 110A, 110B); an electroconductive gas separator (13; 130; 130A; 130B) which cooperates with the cell plate, to form a gas passage; and a holder member (15; 150; 150A; 150B) which holds a part of the cell plate. The cell plate includes a supporting body (37; 370; 370A; 370B), and a cell (39; 390; 390A; 390B) formed on the supporting body. The cell includes a solid electrolyte (43), a cathode substance layer (45) formed on one surface of the solid electrolyte, and an anode substance layer (41) formed on the other surface of the solid electrolyte.

23 Claims, 14 Drawing Sheets

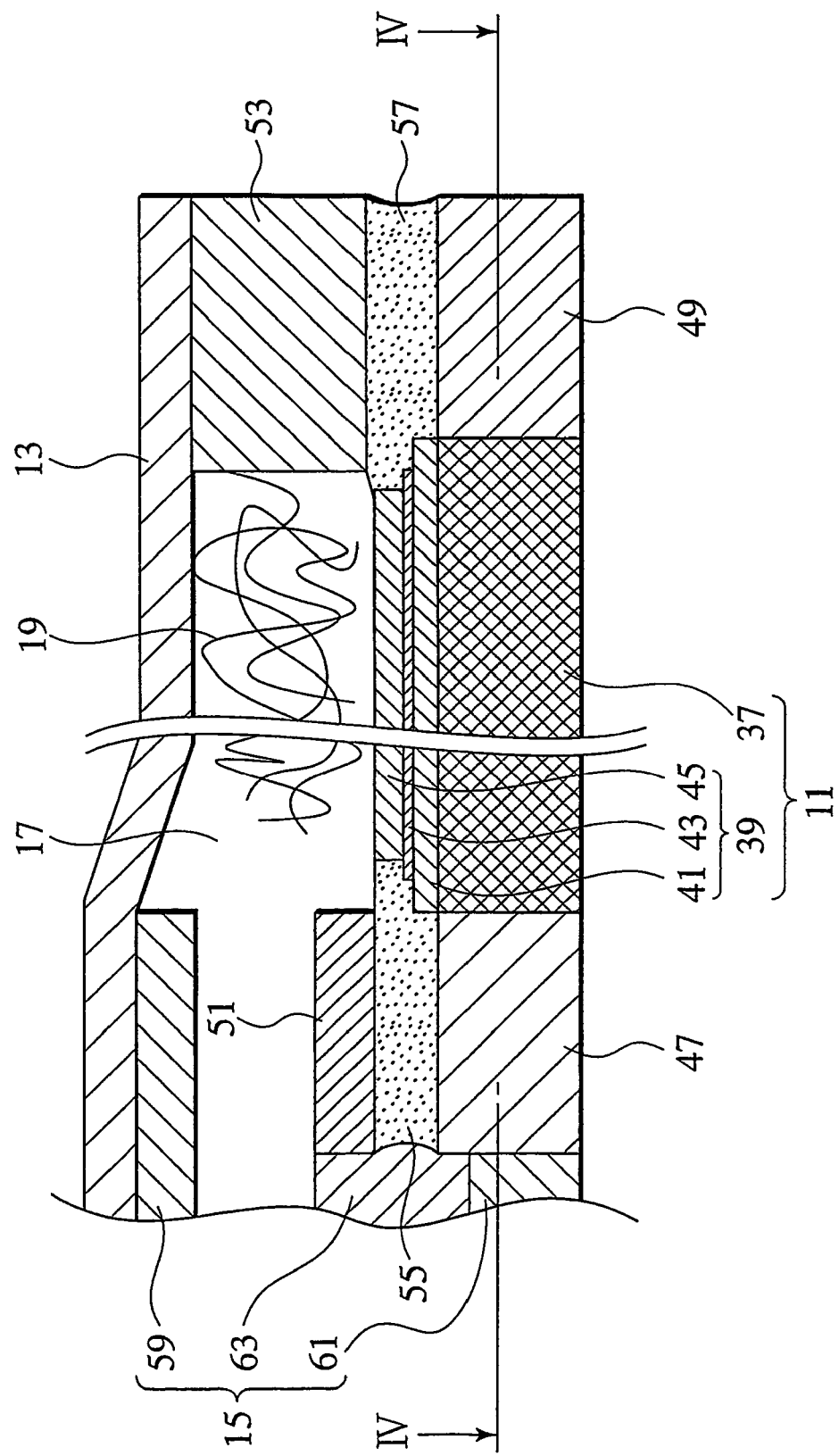

47  37  49

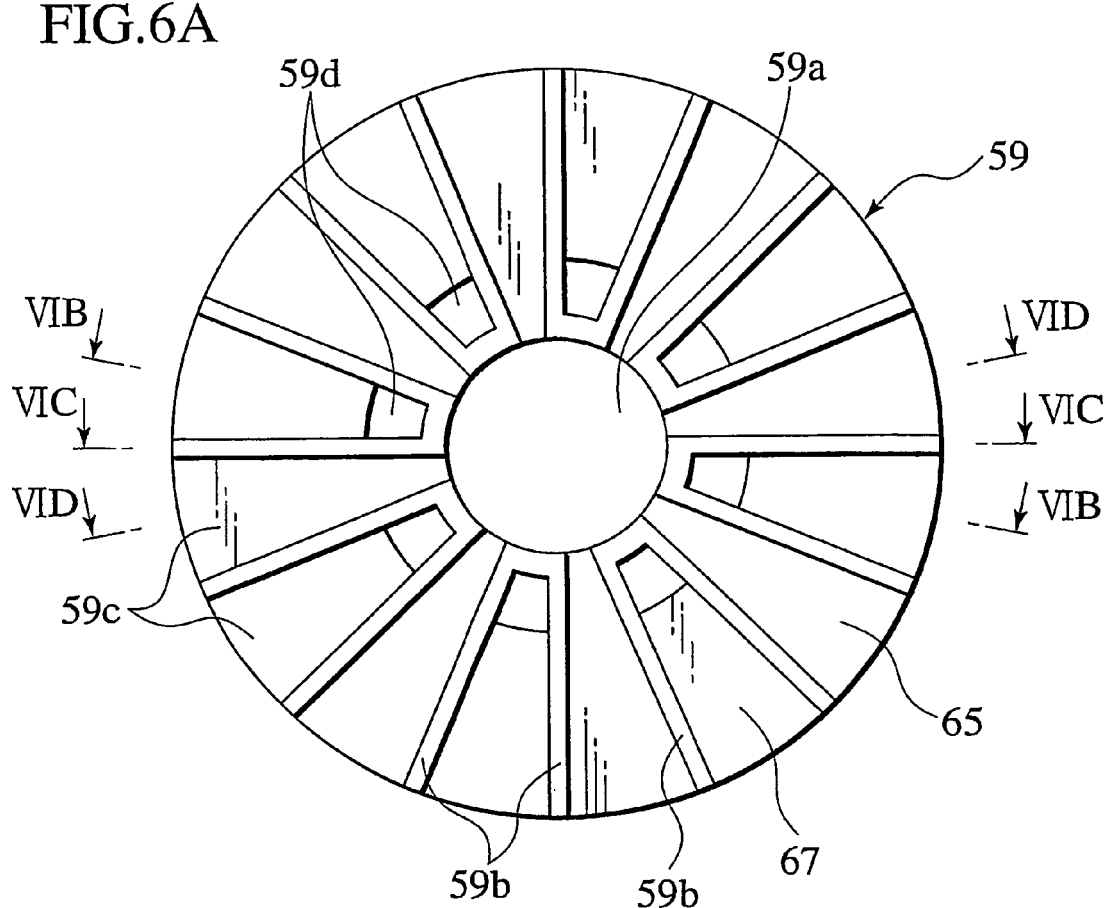
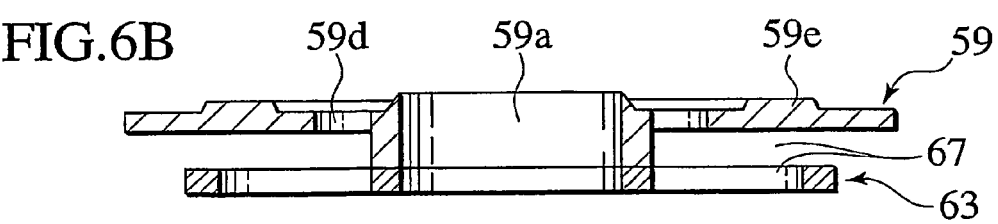
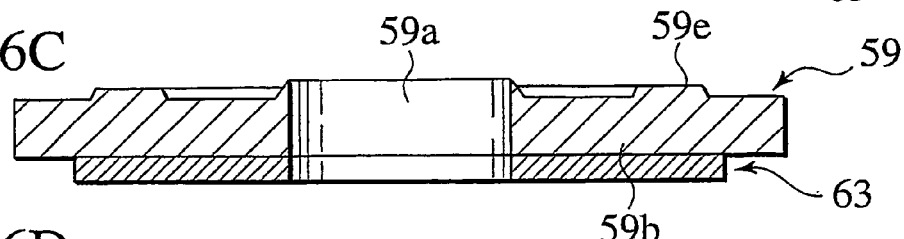
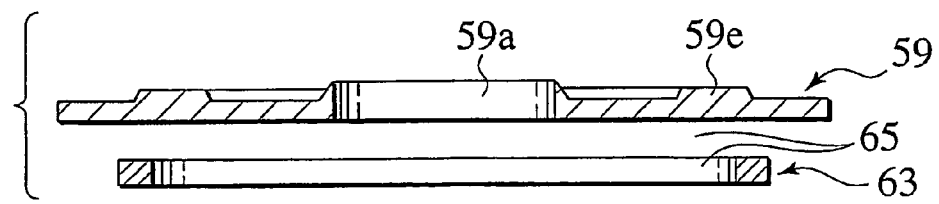

FUEL CELL

TECHNICAL FIELD

The present invention relates to a fuel cell, and more particularly to a fuel cell including a solid electrolyte having one surface provided with a cathode substance and the other surface provided with an anode substance.

BACKGROUND ART

To ensure gas seal and electric connection in a solid electrolyte-type fuel cell (SOFC) having solid electrolyte layers, it has been proposed to prepare two kinds of catalyst layers in thick rectangular plate shapes and formed with gas passages except for peripheral portions thereof, to arrange the catalyst layers at both surfaces of each solid electrolyte layer, respectively, to arrange current collector layers at outer surfaces of the catalyst layers, respectively, to plurally stack such arranged structures so as to constitute a fuel cell stack, and to apply a large load to the fuel cell stack in the stacking direction thereof.

Particularly, because materials such as yttria-stabilized zirconia (YSZ) to be used as solid electrolyte layers are extremely brittle in SOFC which operates at high temperature, it has been proposed to adopt thick members as the solid electrolyte layers on the order of millimeter inclusive of associated neighboring members and in order to attain a strength against thermal stress.

U.S. Pat. No. 6,344,290 discloses a constitution to form the whole of fuel cell into a donut shape and to supply the gases through the central portions of the donut, so as to deal with thermal stresses. Concretely, at that region of the donut outside the central portions for supplying the gases, there are successively formed an anode substance layer, a solid electrolyte layer, and a cathode substance layer on a porous electric-conductor layer. Further, such structures are stacked via corrugated gas separators, respectively, to thereby constitute a fuel cell stack. It is further intended to ensure the electric connection of the whole of the fuel cell stack including electric-power generating regions having the anode substance layers, solid electrolyte layers and cathode substance layers, respectively, by applying a stacking directional pressure to the fuel cell stack.

DISCLOSURE OF INVENTION

However, the present inventors have studied the above-mentioned fuel cell stack and found that the pressure is applied to the whole of the fuel cell stack including the electric-power generating regions, and that these electric-power generating regions are further applied with uneven stresses by convex portions of the corrugations of the gas separators, thereby causing a possibility of affection on the brittle solid electrolyte layers. Particularly, in SOFC, such an affection is likely to become serious due to repeated high and low temperatures during operation.

The present invention has been carried out through such a study conducted by the present inventors, and it is therefore an object of the present invention to provide a fuel cell which particularly has a high-quality solid electrolyte layer and is capable of exhibiting and keeping a higher electric-power generating ability.

To achieve the above object, in one aspect, the fuel cell of the present invention comprises a cell plate provided with: a supporting body, and a cell formed on the supporting body, the cell including a solid electrolyte, a cathode substance layer formed on one surface of the solid electrolyte, and an anode substance layer formed on the other surface of the solid electrolyte; an electroconductive gas separator which cooperates with the cell plate, to form a gas passage; and a holder member which holds a part of the cell plate.

Other and further features, advantages, and benefits of the present invention will become more apparent from the following description taken in conjunction with the following drawings.

BRIEF DESCRIPTION OF DRAWINGS

FIG. 3 is a partially enlarged cross-sectional view of the fuel cell stack of the embodiment in FIG. 2, showing a cell plate and a gas separator in the fuel cell stack;

FIG. 6A is a bottom view of the upper electrode part viewed from the bottom in the stacking direction in FIG. 2, and FIG. 6B, FIG. 6C and FIG. 6D are a VIB-VIB cross-sectional view, a VIC-VIC cross-sectional view and a VID-VID cross-sectional view of the upper electrode part in FIG. 6A, respectively;

BEST MODE FOR CARRYING OUT THE INVENTION

There will be explained hereinafter fuel cells of the embodiments according to the present invention in detail with reference to the drawings.

First Embodiment

There will be firstly explained a fuel cell of a first embodiment according to the present invention in detail with reference to FIG. 1 through FIG. 11C.

Figure 1:
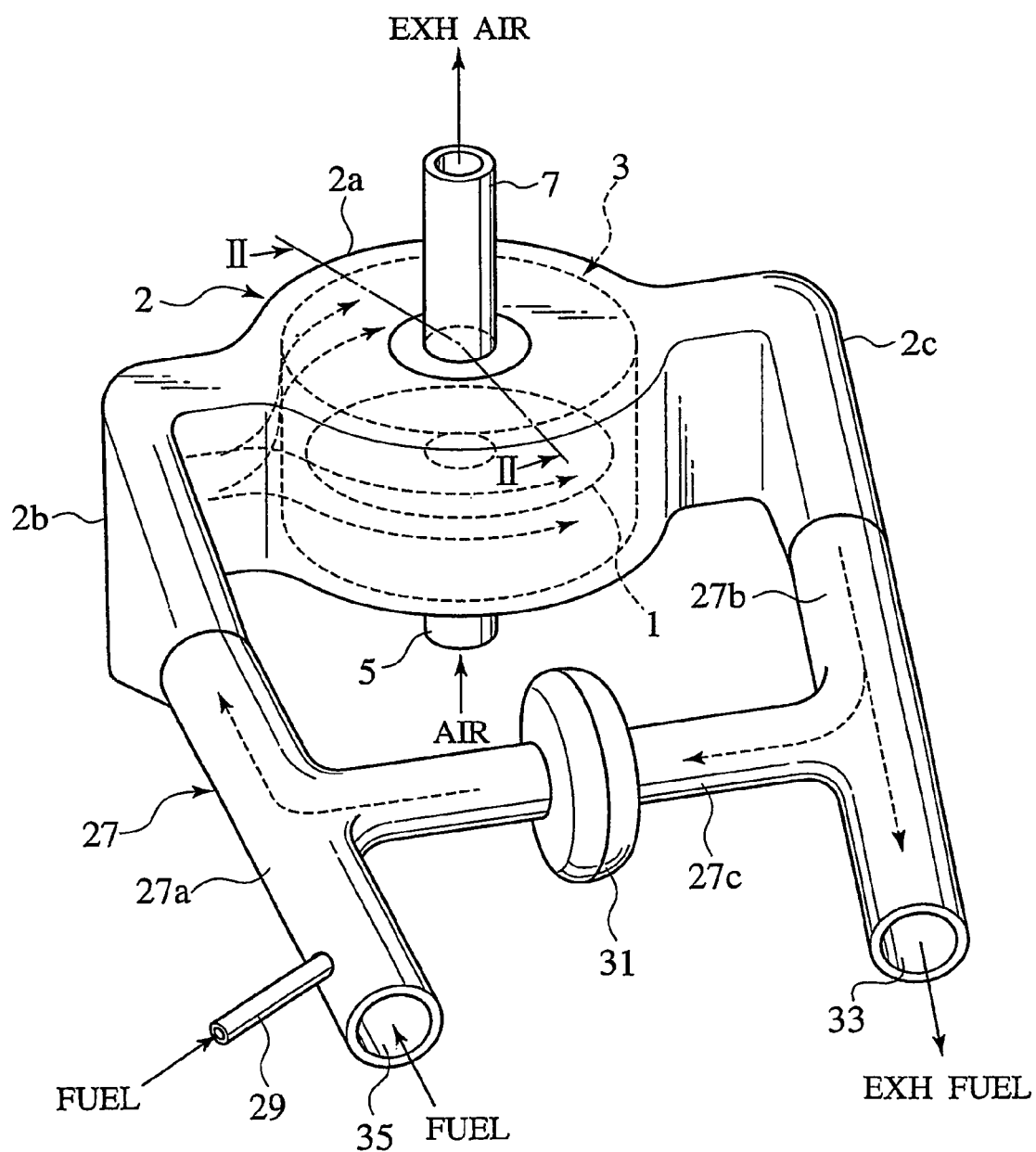
FIG. 1 is a perspective view of a fuel cell stack of a first embodiment according to the present invention, shown in a state where the fuel cell stack is accommodated within a casing.
Figure 2:
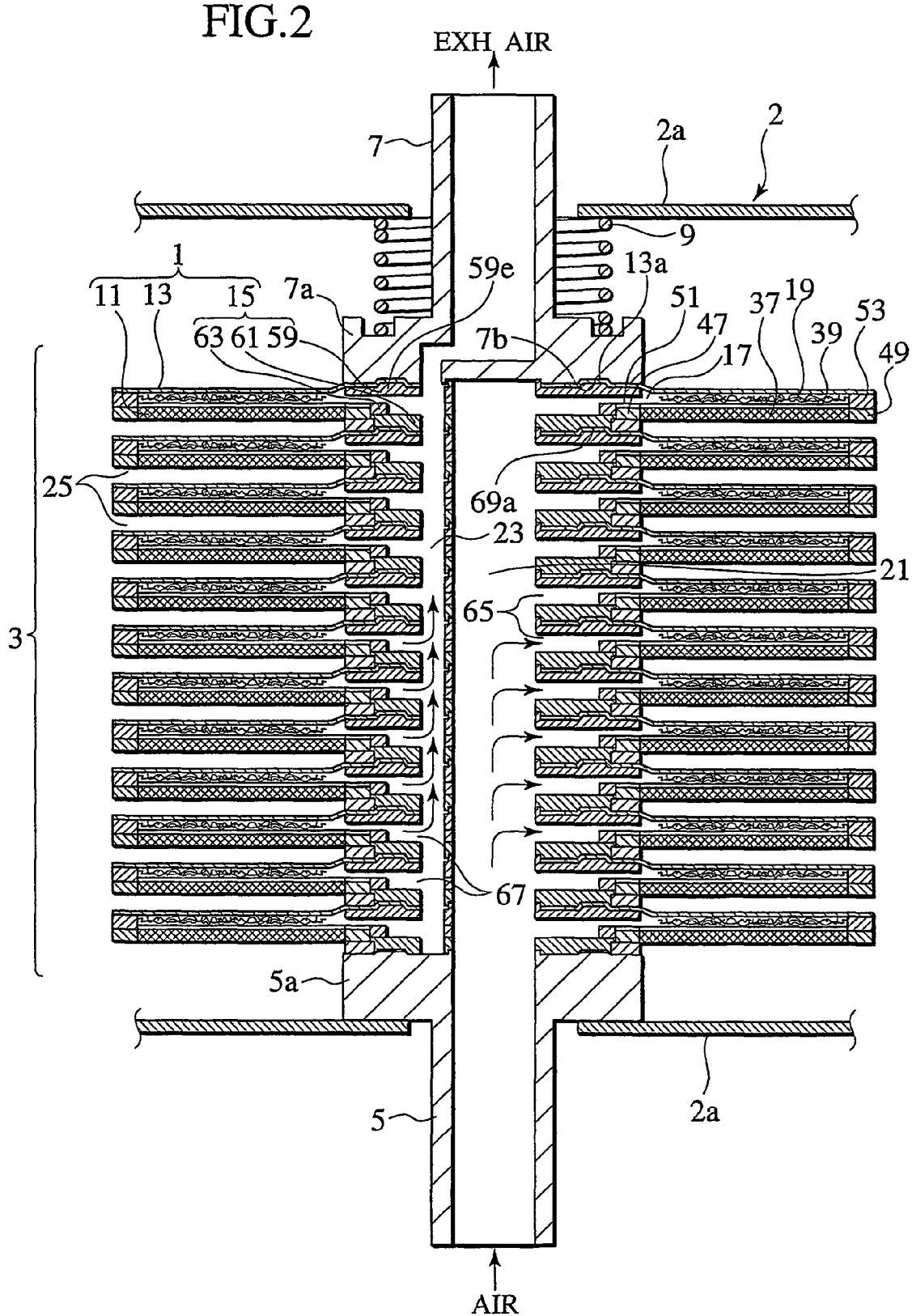
FIG. 2 is a schematic II-II cross-sectional view of the fuel cell stack of the embodiment in FIG. 1, showing an inner structure of the fuel cell stack viewed from a direction perpendicular to a stacking direction of the fuel cell stack which is an up-and-down direction in FIG. 2.

FIG. 1 is a perspective view of fuel cells (i.e., fuel cell stack) of this embodiment in a state accommodated within a casing. FIG. 2 is a schematic II-II cross-sectional view of the fuel cell stack in FIG. 1, showing an inner structure of the stack viewed from a direction perpendicular to a stacking direction of the stack, so as to show a gas supplying conduit 5 and its associated constitution mainly at the right side and a gas exhausting conduit 7 and its associated constitution mainly at the left side. FIG. 3 is a partially enlarged cross-sectional view of the fuel cell stack of FIG. 2, enlargingly showing a cell plate and a gas separator in the stack, mainly, at an inner peripheral side and an outer peripheral side of the disk-like constitution thereof, while omitting intermediate portions of the cell plate and gas separator. Note, the up-and-down direction in FIG. 2 is the stacking direction of the fuel cell stack.

FIG. 1 shows representatively numbered one cell unit 1 functioning as a single fuel cell by itself and, as shown in FIG. 2, including a central opening, and multiple cell units 1 are stacked in the up-and-down direction (stacking direction) in a mutually electrically connected state to thereby constitute a fuel cell stack 3. The fuel cell stack 3 exhibits a cylindrical shape as a whole, and is accommodated within a casing 2. The casing 2 includes a main body portion 2a for accommodating therein the fuel cell stack 3, a fuel supplying portion 2b for supplying a fuel gas for electric-power generation, and a fuel exhausting portion 2c for exhausting the remainder of the fuel consumed for an electric-power generating reaction, and these portions 2a, 2b, 2c are integral with each other.

Concretely, the fuel cell stack 3 is fastened and clamped between a flange portion 5a of the lower gas supplying conduit 5 and a flange portion 7a of the upper gas exhausting conduit 7 by a fastening force applied between the flange portion 5a and the flange portion 7a. That is, after the flange portion 5a of the gas supplying conduit 5 is attached to a bottom of the main body portion 2a of the casing 2 while the flange portion 7a of the gas exhausting conduit 7 is attached to a top portion of the main body portion 2a via spring 9, the fastening force is applied between the top and the bottom of the main body portion 2a of the casing 2, resulting in that cell units 1 of the fuel cell stack 3 are applied with a compressive force in the stacking direction by the spring 9 and are elastically held within the main body portion 2a of the casing 2.

As also enlargedly shown in FIG. 3, each cell unit 1 is constituted of: a cell plate 11; an electroconductive gas separator 13 provided on the cell plate 11; a holder member 15 for clamping and holding a part of the cell plate 11 from the above and bottom thereof. The holder member 15 is arranged through a central through-hole of the disk-like cell plate 11. By fastening the holder members 15 of the cell units 1 between the flange portion 5a of the gas supplying conduit 5 and the flange portion 7a of the gas exhausting conduit 7 to clamp the holder members 15 therebetween while making the gas separators 13 intervened, respectively, the cell units 1 are held between the flange portion 5a and flange portion 7a. In other words, resultantly, the holder member 15, which is a main portion where the fastening portion is applied, holds a part of the cell plate 11 and a part of the gas separator 13, that is, inner periphery potions of cell plate 11 and the gas separator 13 while applying the compressive force due to the fastening force.

Formed between the cell plate 11 and gas separator 13 of each cell unit 1 is a gap which acts as a gas passage 17 and which is filled with a porous medium 19 (e.g. a medium of silver-made thin wires such as silver-made wool-like material) which is an electric conductor having a lower electrical resistance. The gas passage 17 is supplied with air as an oxidative gas (oxidizer gas) for electric-power generation, from the gas supplying conduit 5 and via air supplying channel 21 established throughout the center of stacked multiple holder members 15. The remainder of the air consumed for the electric-power generating reaction is exhausted to the exterior, via air exhausting channel 23 established around the air supplying channel 21 and then via gas exhausting conduit 7.

Meantime, defined between two cell units 1 neighboring in the up-and-down direction is a fuel gas passage 25 shown in FIG. 2. The fuel gas passage 25 is supplied with the fuel gas, which is hydrogen gas in this embodiment, as ambient gas from a conduit unit 27, via fuel supplying portion 2b connected with the conduit unit 27. The remainder of the fuel consumed for the electric-power generating reaction is exhausted to the conduit unit 27, via fuel exhausting portion 2c of the casing 2 connected with the conduit unit 27.

The conduit unit 27 connected to the casing 2 comprises a fuel supplying conduit portion 27a connected to the fuel supplying portion 2b of the casing 2, a fuel exhausting conduit portion 27b connected to the fuel exhausting portion 2c of the casing 2, and a fuel circulating conduit portion 27c for connecting the fuel supplying conduit portion 27a and fuel exhausting conduit portion 27b with each other.

Connected to the fuel supplying conduit portion 27a is a fuel filing conduit 29, at a position upstream of a joint of the fuel circulating conduit portion 27c to the fuel supplying conduit portion 27a. The exhausted fuel gas exhausted from an outlet 33 of the fuel exhausting conduit portion 27b is treated in an exhaust gas treating system (not shown), and the treated fuel gas is returned to the fuel supplying conduit portion 27a via its inlet 35. The fuel circulating conduit portion 27c is provided with a blower 31 for circulating the fuel gas from the fuel exhausting conduit portion 27b to the fuel cell stack 3 via fuel supplying conduit portion 27a.

Thus, the fuel cell stack 3 is supplied with the fuel gas from the fuel filing conduit 29, with the exhausted fuel gas forcibly circulated by the blower 31, and with the fuel gas treated by the exhaust gas treating system.

Incidentally, insofar as concerned with cooling of the center of the cell unit 1 where heat tends to be accumulated, the flow rate of the fuel gas to be forcibly circulated by the blower 31 is preferably as high as possible, so as to improve efficiencies of gas exchange, heat exchange and the like at the surface of cell unit 1 as well as the stability thereof. Practically, such a flow rate is preferably determined taking account of the stacking dimension between two neighboring cell units 1 and of a balance between an electric-power generating efficiency and an energy consumed therefor, because some energy is naturally consumed to attain such a flow rate.

Next, there will be explained hereinafter the cell plate 11 in each cell unit 1.

As shown in FIGS. 2 and 3, the cell plate 11 comprises a porous metal plate 37 as a supporting body, and a cell 39 provided on one surface, i.e., on an upper surface of the porous metal plate 37. The cell 39 is constituted by stacking an anode substance layer 41, a solid oxide electrolyte layer (hereinafter simply called "solid electrolyte layer") 43 and a cathode substance layer 45, successively from the porous metal plate 37 side. The porous metal plate 37 has substantially the same thermal expansion coefficient as the solid electrolyte layer 43.

As shown in FIG. 3, such three layers are provided with the anode substance layer 41, solid electrolyte layer 43 and cathode substance layer 45 on the porous metal plate 37 are formed in a manner that the upper one is not protruded beyond an outer periphery of the lower one. Namely, the anode substance layer 41 is formed over substantially the whole of porous metal plate 37, the solid electrolyte layer 43 is formed on the anode substance layer 41 in an area smaller than that of the anode substance layer 41, and so is the cathode substance layer 45 relative to the solid electrolyte layer 43.

Figure 4A:
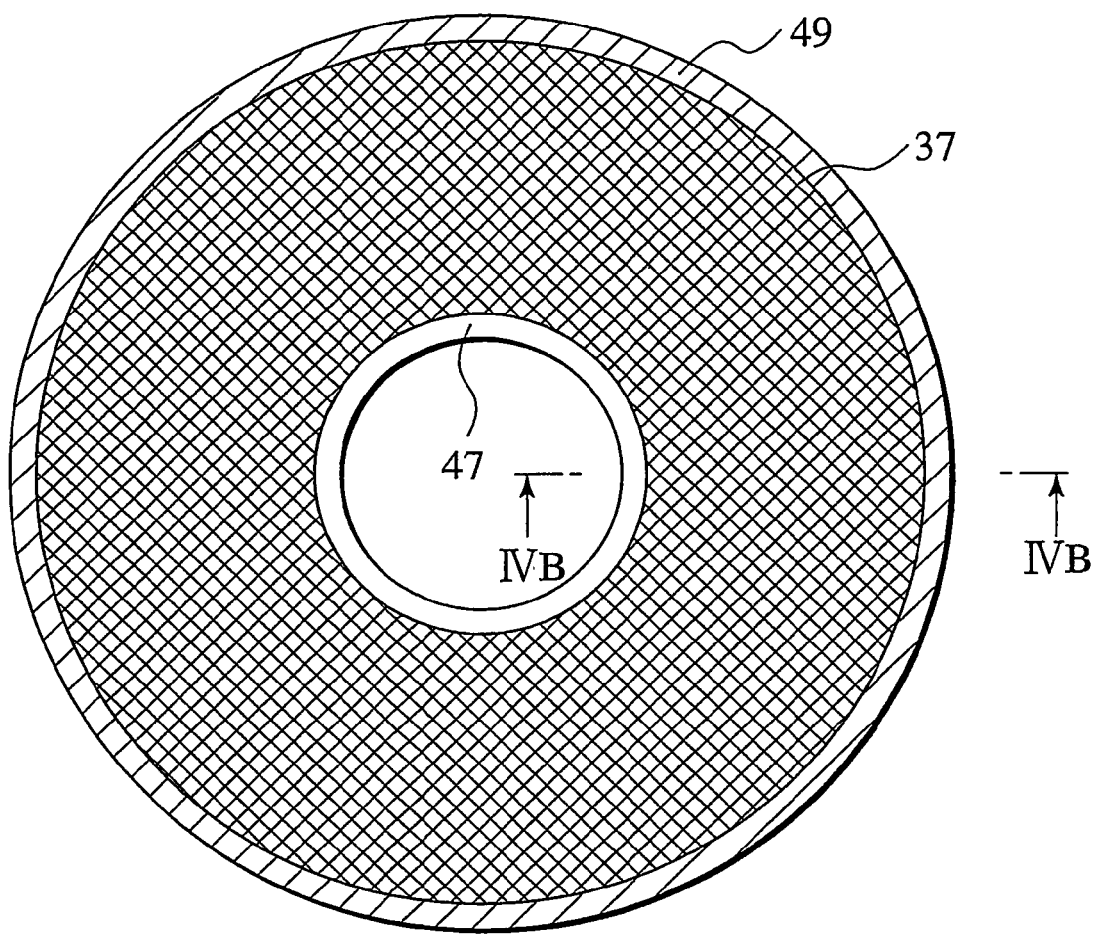
FIG. 4A is an IV-IV cross-sectional view of the fuel cell stack of the embodiment of FIG. 3, showing a structure of a porous metal plate of the fuel cell stack viewed from the stacking direction.
Figure 4B:
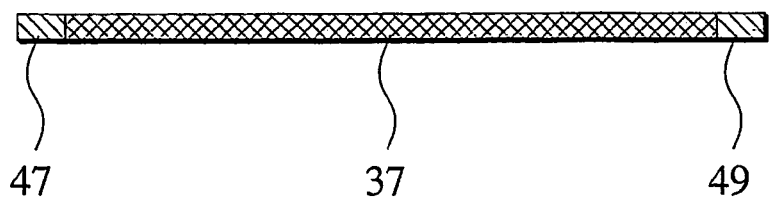
FIG. 4B is an IVB-IVB cross-sectional view of the structure in FIG. 4A.

FIG. 4A is an IV-IV cross-sectional view of the porous metal plate 37 in FIG. 3 viewed from the stacking direction, and FIG. 4B is an IVB-IVB cross-sectional view of the plate in FIG. 4A.

As shown in FIG. 3 through FIG. 4B, the porous metal plate 37 is fixed, at its inner and outer peripheral sides, with annular bulk members 47 and 49 as gas-impermeable metal members, each being made of the same material and having substantially the same thermal expansion coefficient as the porous metal plate 37.

Adhered onto the bulk members 47 and 49 are insulating ceramic plates 51, 53 as insulating members by ceramic adhesives 55, 57, respectively. The insulating ceramic plates 51, 53 and ceramic adhesives 55, 57 have substantially the same thermal expansion coefficients as the bulk members 47, 49, and may be preferably based on zirconium oxide when the solid electrolyte layer 43 is made of YSZ.

The adhering interfaces of the ceramic adhesives 55, 57 are closely contacted with the inside and outside peripheries of the cell 39 including the solid electrolyte layer 43 so as to cover the gas permeating areas along the inside and outside peripheries of the porous metal plate 37, respectively, thereby ensuring a gas sealability. Note, the insulating ceramic plates 51, 53 have mirror-polished upper surfaces, respectively.

Joined to the upper surface of the insulating ceramic plate 53 is an outer periphery of the gas separator 13.

Although the ceramic adhesives 55, 57 are necessary so as to airtightly seal the interior of the cell unit 1 such as the gas passage 17 by providing the gas separator 13 onto the cell plate 11 after mounting the holder member 15 to the cell plate 11, extremely less usage amounts of adhesives are preferable. Instead of the ceramic adhesives 55, 57, it is possible to alternatively ultrasonic join the insulating ceramic plates 51, 53 to the bulk members 47, 49, respectively, through brazing materials.

Next, there will be explained hereinafter the holder member 15 in each cell unit 1.

Figure 5:
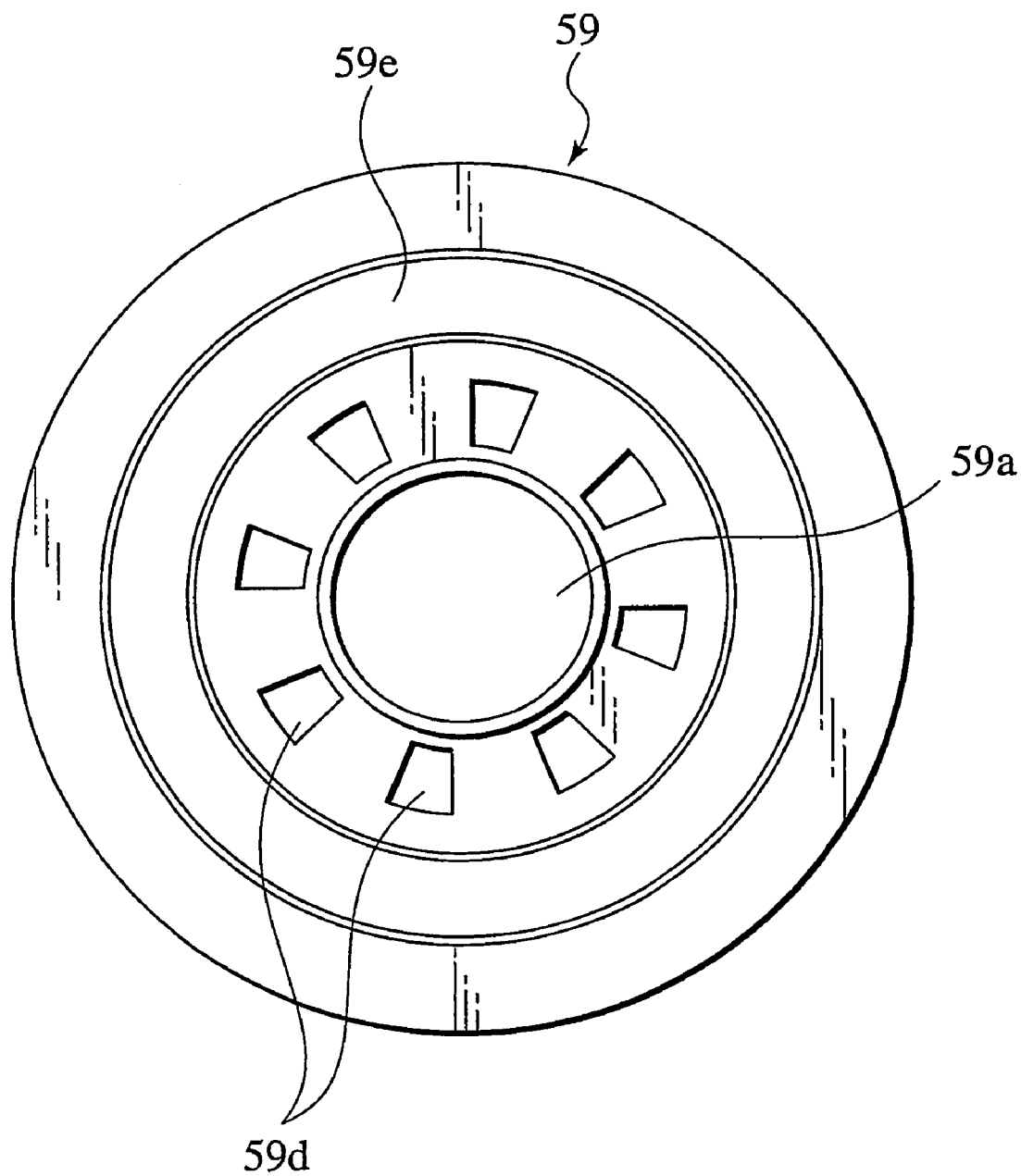
FIG. 5 is a top view of an upper electrode part of the fuel cell stack of the embodiment viewed from the above in the stacking direction in FIG. 2.
Figure 7:
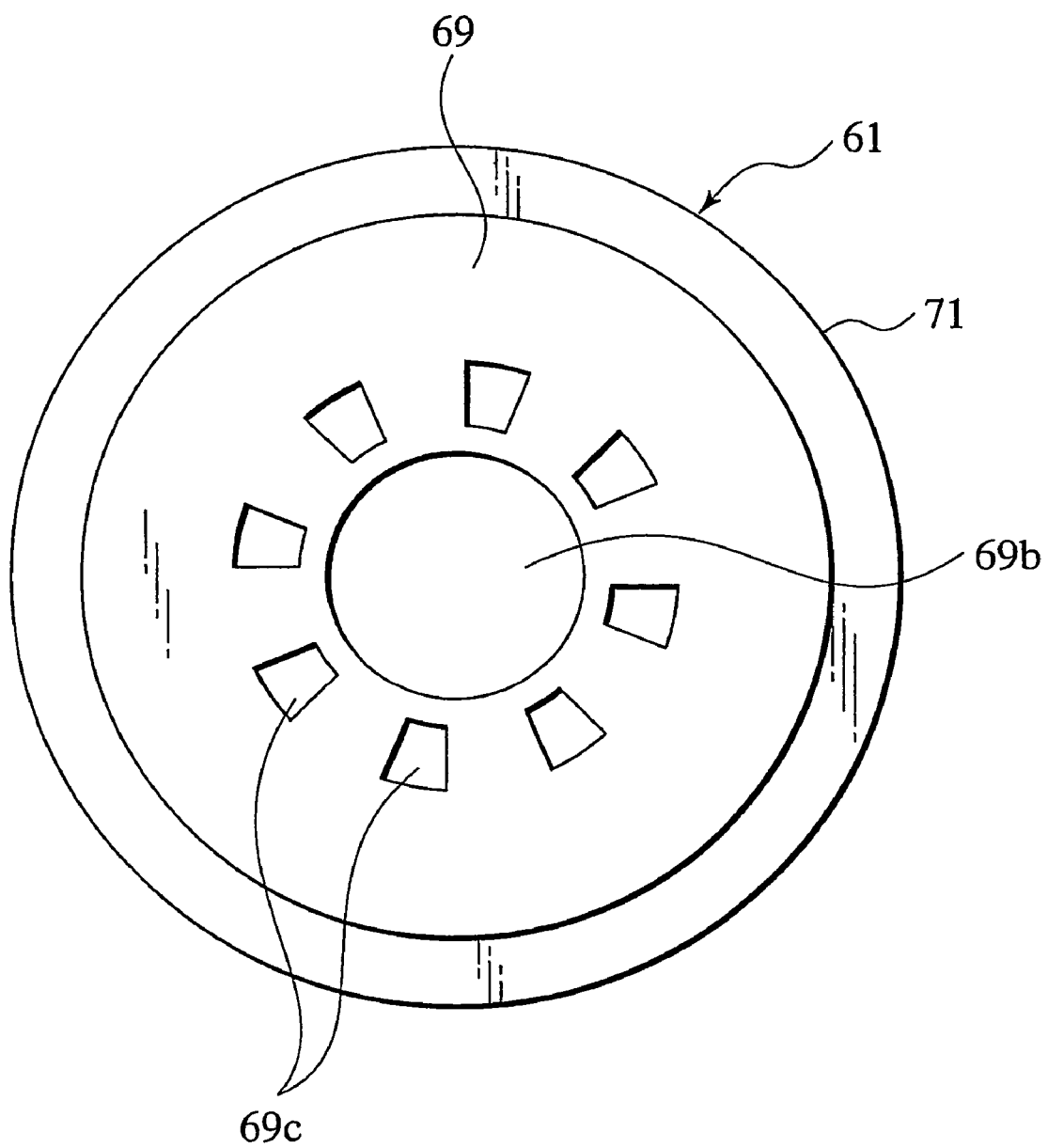
FIG. 7 is a top view of a lower electrode part of the fuel cell stack of the embodiment viewed from the above in the stacking direction in FIG. 2.
Figure 8A:
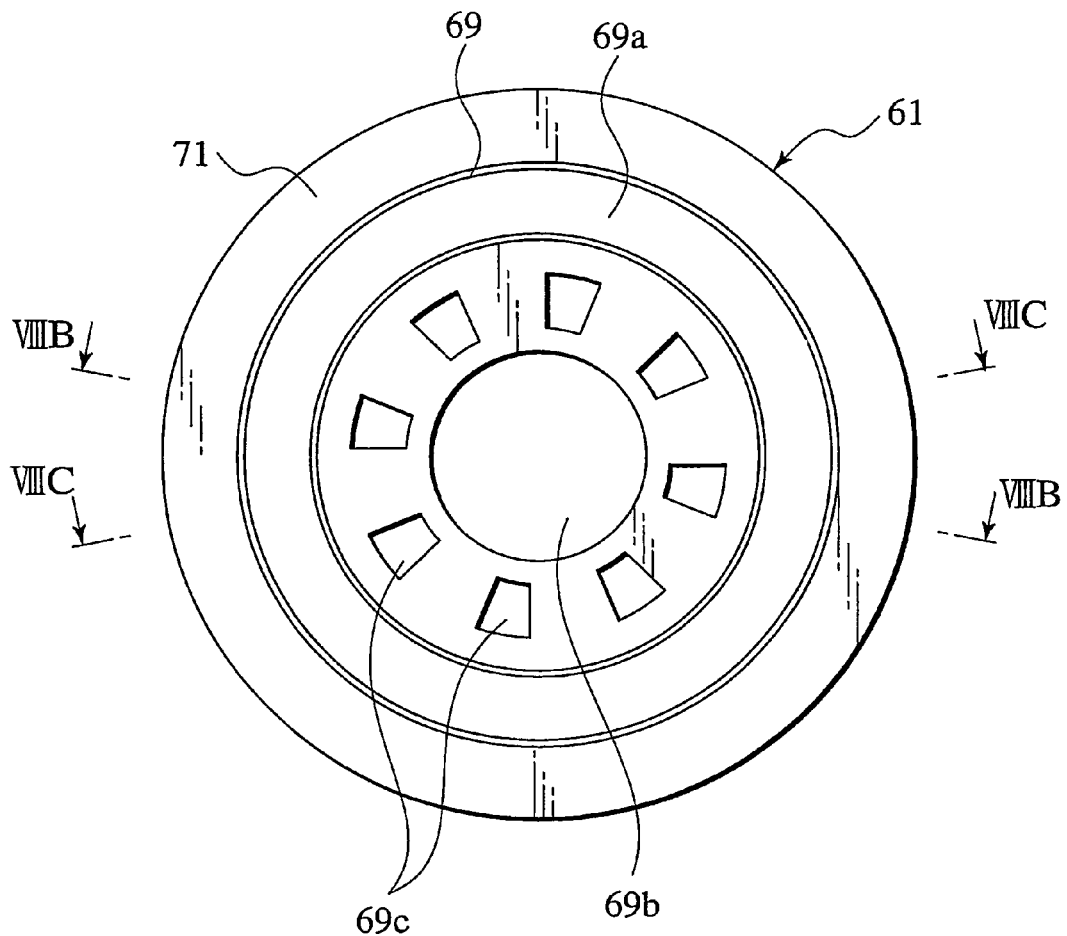
FIG. 8A is a bottom view of the lower electrode part viewed from the bottom in the stacking direction in FIG. 2, and FIG. 8B and FIG. 8C are a VIIIB-VIIIB cross-sectional view and a VIIIC-VIIIC cross-sectional view of the lower electrode part in FIG. 8A, respectively.
Figure 8B:
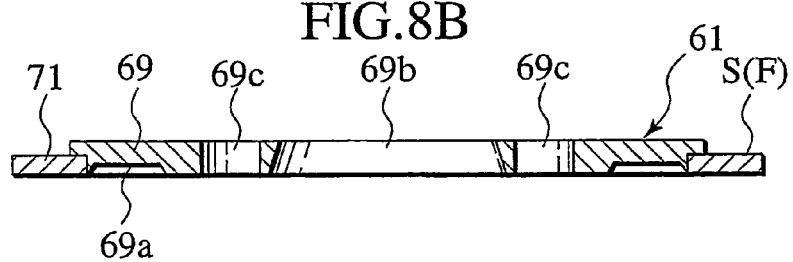
Figure 8C:
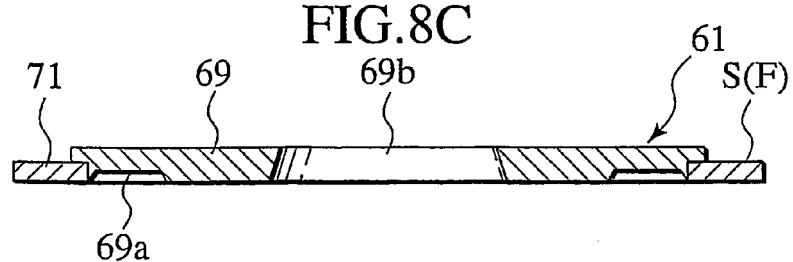
Figure 9A:
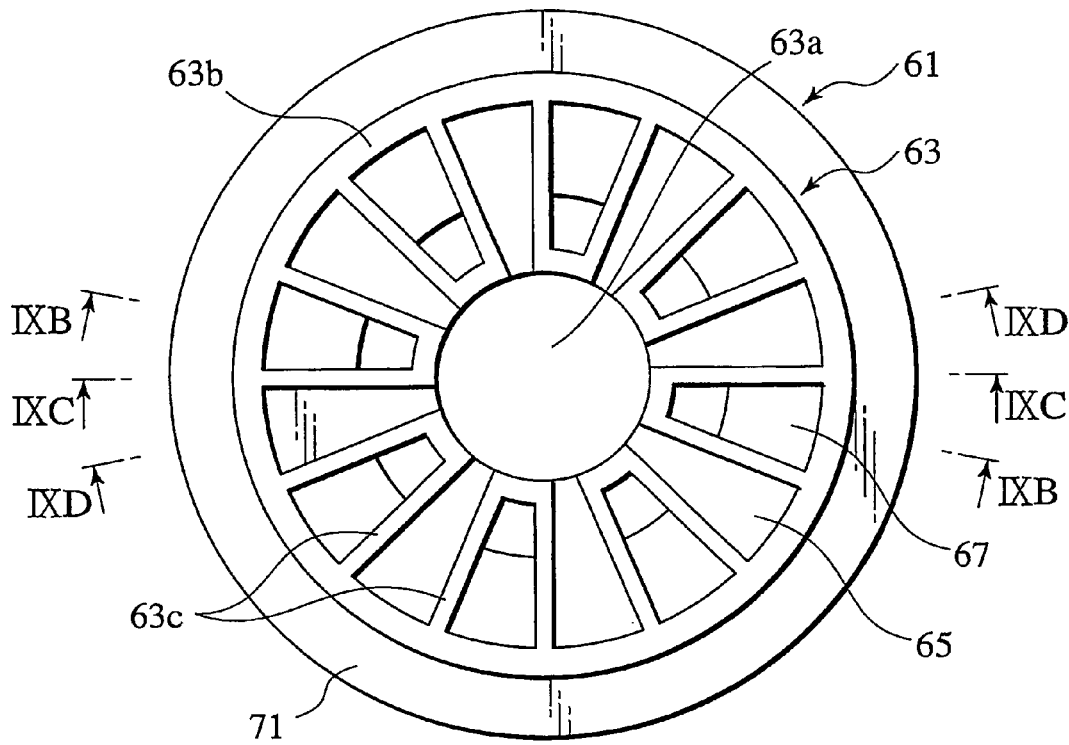
FIG. 9A is a top view of an insulating part of the fuel cell stack of the embodiment viewed from the above in the stacking direction in FIG. 2, and FIG. 9B, FIG. 9C and FIG. 9D are an IXB-IXB cross-sectional view, an IXC-IXC cross-sectional view and an IXD-IXD cross-sectional view of the insulating part in FIG. 9A, respectively.
Figure 9B:
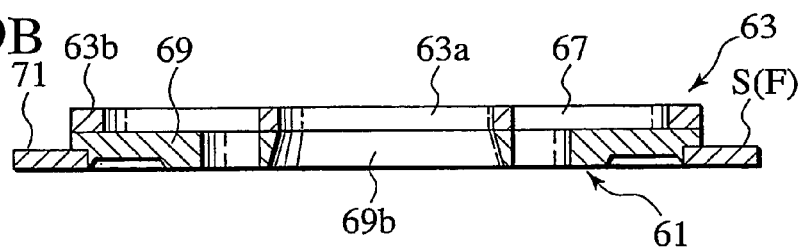
Figure 9C:
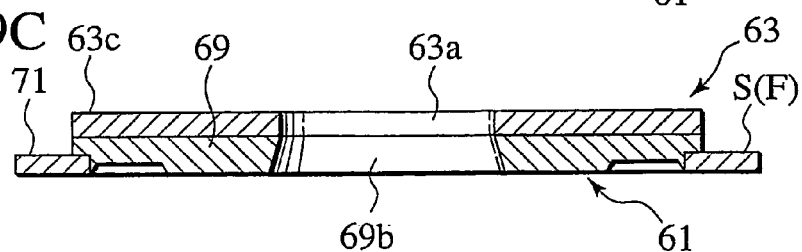
Figure 9D:
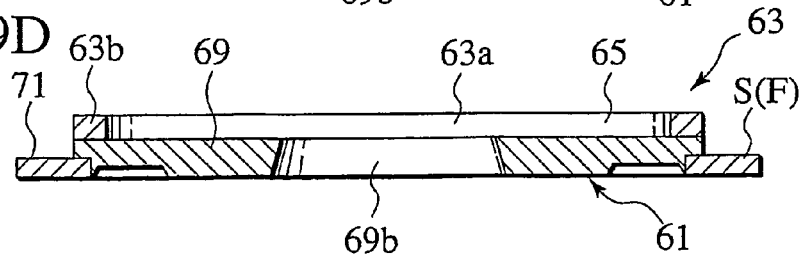

FIG. 5 is a top view of an upper electrode part 59 viewed from the above in the stacking direction. FIG. 6A is a bottom view of the upper electrode part 59 viewed from the bottom in the stacking direction, and FIG. 6B, FIG. 6C and FIG. 6D are a VIB-VIB cross-sectional view, a VIC-VIC cross-sectional view and a VID-VID cross-sectional view of the upper electrode part in FIG. 6A, respectively. FIG. 7 is a top view of a lower electrode part 61 viewed from the above in the stacking direction. FIG. 8A is a bottom view of the lower electrode part 61 viewed from the bottom in the stacking direction, and FIG. 8B and FIG. 8C are a VIIIB-VIIIB cross-sectional view and a VIIIC-VIIIC cross-sectional view of the lower electrode part in FIG. 8A, respectively. FIG. 9A is a top view of an insulating part 63 viewed from the above in the stacking direction, and FIG. 9B, FIG. 9C and FIG. 9D are an IXB-IXB cross-sectional view, an IXC-IXC cross-sectional view and an IXD-IXD cross-sectional view of the insulating part 63 in FIG. 9A, respectively. Note, FIGS. 6B through 6D also show the insulating part 63, for better understanding of the positional alignment thereof. Similarly, FIGS. 9A through 9D show the lower electrode part 61, for better understanding of the positional alignment thereof.

The holder member 15 is constituted of three members, i.e., the upper electrode part 59 as a first member shown in FIG. 5 through FIG. 6D, the lower electrode part 61 as a second member shown in FIG. 7 through FIG. 8C, and the insulating part 63 acting as an electrically insulative member shown in FIGS. 9A through 9D for interconnecting the upper and lower electrode parts 59, 61 with each other in an electrically insulative manner. The upper and lower electrode parts 59, 61 are to ensure the electric connections at the obverse and reverse sides of the cell plate 11, respectively, while the insulating part 63 is to ensure the insulation between the upper and lower electrode parts 59, 61.

As shown in FIGS. 5 through 6D, the upper electrode part 59 is centrally formed with a central circular through-hole 59a. This central through-hole 59a constitutes a part of the air supplying channel 21 shown in FIG. 2, and is communicated with gas flow-paths 65.

The upper electrode part 59 has a bottom surface formed with a plurality of gas partitioning walls 59b at equal circumferential intervals so as to be protruded toward the lower electrode part 61.

Provided among gas partitioning walls 59b are flat-plate portions 59c, respectively. Alternately provided between and at the inner peripheral sides of the flat-plate portions 59c are side through-holes 59d along the circumferential direction. The side through-holes 59d constitute a part of the air exhausting channel 23 shown in FIG. 2. The side through-holes 59d are communicated with gas flow-paths 67, respectively. The gas partitioning walls 59b separate the gas flow-paths 65 communicating with the central through-hole 59a, from the gas flow-paths 67 communicating with the side through-holes 59d, respectively.

Formed on an upper surface of the upper electrode part 59 is an annular convex portion 59e outside the side through-holes 59d. As shown in FIG. 2, the annular convex portion 59e is fitted into a concave portion 69a of the lower electrode part 61 of the neighboring upper cell unit 1, while interposing an upward bent portion 13a of the gas separator 13 therebetween. Concerning an annular convex portion 59e of the upper electrode part 59 of the topmost cell unit 1, it is fitted into a concave portion 7b formed on a lower surface of the flange portion 7a of the gas exhausting conduit 7, while interposing a bent portion 13a of the associated gas separator 13 therebetween.

Namely, the upper electrode part 59 is electrically connected to the associated gas separator 13, and the gas separator 13 spreads between the annular convex portion 59e and the concave portion 7b or concave portion 69a, thereby also ensuring the gas sealability.

Incidentally, preferably, the upper electrode part 59 is a metal having the same thermal expansion coefficient as the porous metal plate 37.

As shown in FIGS. 7 through 8C, the lower electrode part 61 includes an electrode body 69, and a ring 71 mounted on that outer peripheral side of the electrode body 69 away from the upper electrode part 59. The electrode body 69 is formed with a circular central through-hole 69b aligned with the central through-hole 59a of the upper electrode part 59, and formed with multiple side through-holes 69c around the central through-hole 69b and aligned with the side through-holes 59d, respectively. The central through-hole 69b constitutes a part of the air supplying channel 21 shown in FIG. 2, while the side through-holes 69c constitute a part of the air exhausting channel 23 shown in FIG. 2.

The gas flow-paths 65, 67 shown in FIG. 6 are defined between the upper electrode part 59 and lower electrode part 61 while interposing therebetween an insulating part 63 to be described later in detail, by pressingly arranging the gas partitioning walls 59b at the lower surface of the upper electrode part 59 toward positions between the side through-holes 69c at the upper surface of the lower electrode part 61, respectively, via insulating part 63.

The ring 71 is incorporated into the cell unit 1 and pressed from a direction opposite to the upper electrode part 59, so as to be held in a state where the inner peripheral portion of the cell unit 1 corresponding to the bulk member 47 shown in FIG. 3 is positioned between the upper electrode part 59 and lower electrode part 61. In this way, incorporation of the ring 71 separated from the electrode body 69 facilitates the assembling of the cell unit 1.

Mutual contacting areas S of the ring 71 and electrode body 69 and of the ring 71 and bulk member 47 are mirror polished. Bringing the respective contacting areas S into the mirrored states in this way enables to realize a practically sufficient seal by virtue of surface joints, by pressing the contacting areas S by a pressure on the order of 100 MPa to 200 MPa. Further, since the sealing portions are not fixed at all, the contacting areas are allowed to correspondingly release stresses upon occurrence thereof, thereby avoiding affection of stresses and thereby improving the reliability.

Incidentally, the lower electrode part 61 is preferably a metal having a thermal expansion coefficient equivalent to that of the porous metal plate 37.

As shown in FIGS. 9A through 9D, the insulating part 63 is formed with a circular central through-hole 63a to be aligned with the central through-hole 69b of the lower electrode part 61. The central through-hole 63a constitutes a part of the air supplying channel 21 shown in FIG. 2. The insulating part 63 comprises a ring portion 63b at an outer peripheral side positioned on the outer peripheral side of the electrode body 69 of the lower electrode part 61 as also shown in FIGS. 9B and 9D, and comprises radial portions 63c contacted with the gas partitioning walls 59b of the upper electrode part 59, respectively, as also shown in FIG. 6C.

Incidentally, the insulating part 63 preferably has a thermal expansion coefficient equivalent to those of the upper and lower electrode parts 59, 61.

As described above, the central through-holes 59a, 69b, 63a of the upper and lower electrode parts 59, 61 and insulating part 63 as well as the gas flow-paths 65 defined between the upper and lower electrode parts 59, 61 via insulating part 63, cooperatively constitute a gas supplying passage for supplying the gas (i.e., air for electric-power generation) to each gas passage 17 positioned between the associated cell plate 11 and gas separator 13. Further, the side through-holes 59d, 69c of the upper and lower electrode parts 59, 61 and the gas flow-paths 67 defined between the upper and lower electrode parts 59, 61 via insulating part 63 (specifically, those portions of the insulating part 63 corresponding to the side through-holes 59d, 69c), cooperatively constitute a gas exhausting passage for exhausting the gas (i.e., the remainder of air after electric-power generation) from the gas passage 17.

In the holder member 15 comprising the upper and lower electrode parts 59, 61 and insulating part 63, the three members are provided with the upper electrode part 59, lower electrode part 61 and insulating part 63 except for the ring 71 of the lower electrode part 61 are previously joined to one another such as by brazing, thereafter the thus airtightly joined three members are incorporated with the cell plate 11 and gas separator 13, and then the bulk member 47 at the inner peripheral edge is pressed by the ring 71 to thereby ensure the gas sealability.

Such a constitution of the holder member 15 brings about a freedom of mutual dimensions of the cell plate 11 and holder member 15, and appropriate pressurization upon stacking allows the assembling capable of compensating for dimensional deviations such as in the thickness direction (i.e., stacking direction) of the cell plate 11 and holder member 15.

Incidentally, it is of course unnecessary to separately provide the ring 71 such as when dimensional variances in the thickness direction are not required to be compensated for or the assembling of the holder member 15 can be performed simultaneously with the cell plate 11 and gas separator 13, so that the holder member 15 may be then simply constituted of the only three members.

Figure 10:
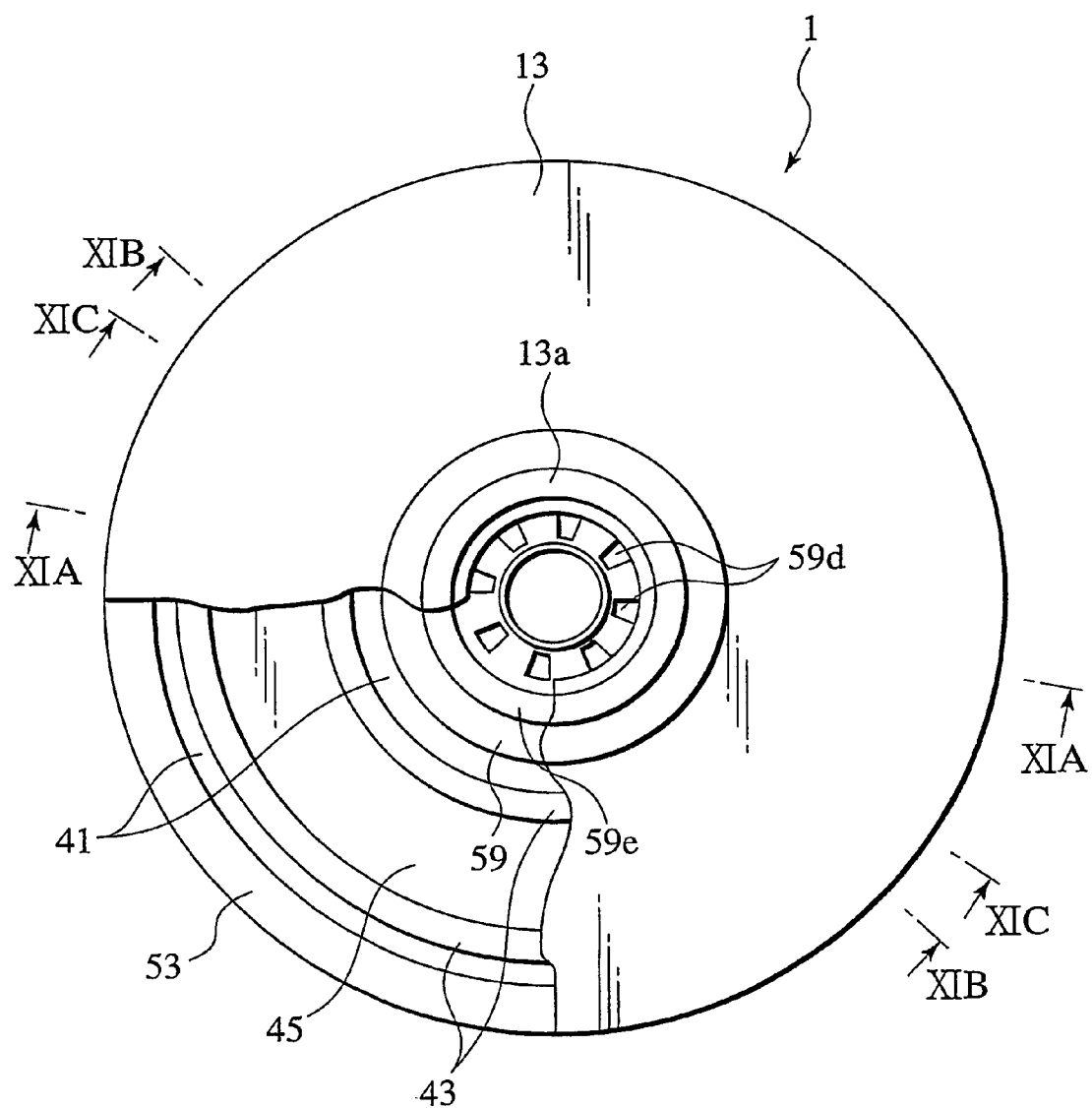
FIG. 10 is a top view of a cell unit of the fuel cell stack of the embodiment viewed from the above in the stacking direction in FIG. 2, in a state where a part of the separator is cut away.
Figure 11:
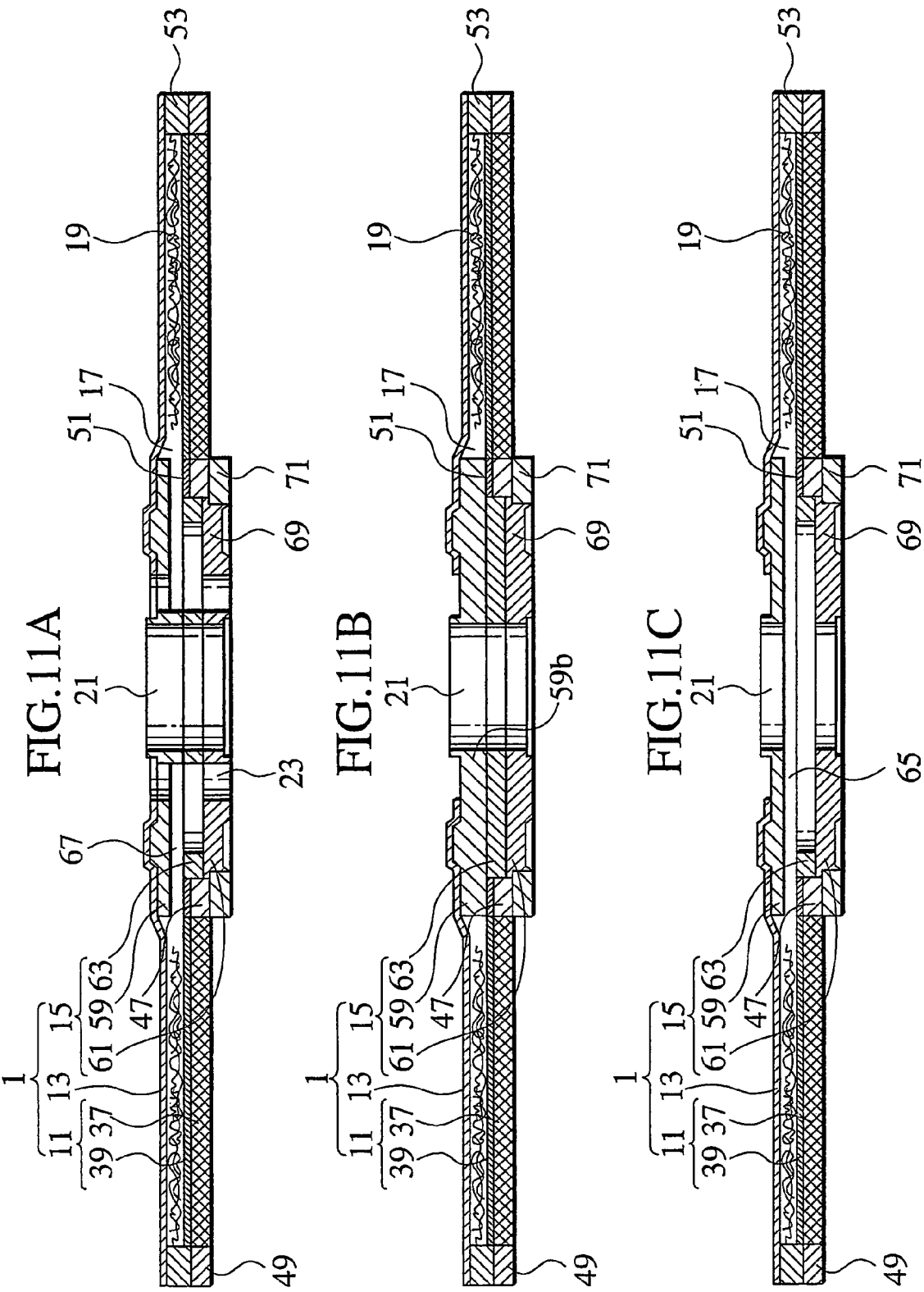
FIG. 11A, FIG. 11B and FIG. 11C are an XIA-XIA cross-sectional view, an XIB-XIB cross-sectional view and an XIC-XIC cross-sectional view of the cell unit in FIG. 10, respectively.

FIG. 10 is a top view of the cell unit 1 viewed from the above in the stacking direction, in a state where a part of the gas separator 13 is cut away by approximately ¼. FIG. 11A is an XIA-XIA cross-sectional view of the cell unit 1 in FIG. 10 and shows a constitution for communicating the air exhausting channel 23 to each gas passage 17 via associated gas flow-paths 67, FIG. 11B is an XIB-XIB cross-sectional view of the cell unit in FIG. 10 and shows a constitution of positions corresponding to the gas partitioning walls 59b of the upper electrode part 59, and FIG. 11C is an XIC-XIC cross-sectional view of the cell unit 1 in FIG. 10 and shows a constitution for communicating the air supplying channel 21 to each gas passage 17 via associated gas flow-paths 65. Note, the wool material (porous medium) 19 is omitted in FIG. 10. Seen below the gas separator 13 are the upper electrode part 59 of the holder member 15, and the anode substance layer 41, cathode substance layer 45, solid electrolyte layer 43 and anode substance layer 41 of the cell plate 11, sequentially from the center side.

Next, there will be explained hereinafter an operation of the fuel cell stack 3 having the above constitution.

As shown in FIGS. 1 and 2, air as an oxidative gas is supplied from the lower gas supplying conduit 5 to the air supplying channel 21 within the fuel cell stack 3, so that the supplied air is further fed to the gas passages 17 each accommodating therein the wool material (porous medium) 19, respectively, via associated gas flow-paths 65 between these mutually opposed upper electrode parts 59 and lower electrode parts 61, respectively.

Meanwhile, the fuel gas, that is, hydrogen gas as ambient gas is supplied from the fuel supplying conduit portion 27a of the conduit unit 27 into the casing 2 accommodating the fuel cell stack 3 therein, so that the supplied hydrogen gas is fed from the periphery of the fuel cell stack 3 to the fuel gas passages 25 between cell plates 11 and gas separators 13 of the neighboring cell units 1, respectively (in FIG. 2, the hydrogen gas is fed in a direction substantially perpendicular to the drawing plane).

In this way, electric-power generation is performed in the fuel cell stack 3, by feeding air and fuel to one side and the other of each cell unit 1, respectively.

Further, the air fed to each gas passage 17 is flowed out after an electric-power generating reaction, via associated gas flow-paths 67 into the air exhausting channel 23, and to the exterior of the fuel cell stack 3 via gas exhausting conduit 7.

Meanwhile, the exhaust gas of the fuel fed to the periphery of the fuel cell stack 3 is exhausted from the fuel exhausting portion 2c to the fuel exhausting conduit portion 27b, and then partially to the fuel circulating conduit portion 27c, and partially through the outlet 33 to the exhaust gas treating system (not shown) for treating the exhaust gas. The treated gas is returned to the fuel supplying conduit portion 27a from the inlet 35, and again supplied to the fuel cell stack 3.

The following effects are exhibited by the fuel cell stack of this embodiment having the above constitution.

(1) Concerning each cell plate 11 in which the associated cell 39 is constituted to include the cathode substance layer 45 and anode substance layer 41 at one surface and the other of the solid electrolyte layer 43, respectively, and in which the cell 39 is supported by one surface of the porous metal plate 37 acting as a supporting body, the associated holder member 15 holds a part of the cell plate 11 (corresponding to the bulk member 47). Thus, the holding force by the holder member 15 never affects largely on the cell 39 including the solid electrolyte layer 43, thereby allowing to restrict the affection on the solid electrolyte layer 43 and to prevent deterioration of the electric-power generating ability.

(2) It is unnecessary for the solid electrolyte layer 43 to have an excessive strength, thereby enabling to thin the cell 39, so that both the heat capacity and weight thereof can be remarkably reduced.

(3) Concerning sealability, the fixing portion for the cell plate 11 is separated from the solid electrolyte layer 43 included in the electric-power generating region and is not placed at the solid electrolyte layer 43 and porous metal plate 37 which are relatively brittle, so that the affection of thermal expansion on the sealed portion of the cell plate 11 is remarkably reduced, thereby allowing to keep the gas sealability over a long period of time.

(4) By supplying a necessary and sufficient amount of air to the air supplying channel 21 through the respective holder members 15, the air after consumption can be freely flowed out via air exhausting channel 23, thereby remarkably simplifying the control. In the fuel cell constituted as a solid oxide electrolyte type, substantially no reaction products except for water are conveyed into the air side, so that the system can be simplified without affecting the environment and human body and without requiring a catalyst treatment of the exhaust gas.

(5) The gas flow at the fuel side is never contaminated with nitrogen which is existent within the exhaust gas at the air side, thereby allowing a limited flow rate of the fuel gas, so that the scale of exhaust gas treatment at the fuel side is extremely reduced, and the number of kinds of gases is reduced to allow a simplified system constitution.

(6) In the fuel cell stack 3 in the constitution of this embodiment, the output voltage of the most effective electric power obtainable from a single cell unit 1 is on the order of 1 V, thereby causing a possibility that the output voltage is largely affected by a contact resistance at electric connecting portions of the cell unit.

Thus, at those sites of each cell unit 1 where electric connecting surfaces are exposed to oxygen such as the surface of upper electrode part 59 of the holder member 15 and that surface of the gas separator 13 which is contacted with the surface of upper electrode part 59 in this embodiment, there are formed thin films made of silver such as by vapor deposition, which thin films are relatively soft and rarely form oxide films at surfaces of the thin films themselves even at high temperatures. In this way, the electric contact can be satisfactorily maintained.

Such thin films by vapor deposition of materials like silver which are soft and rarely form oxides even at high temperatures are not limited to the above-mentioned sites of course, and may be applied as a thin film F to at least one of surfaces of the above-mentioned joining areas S for achieving gas seal by surface joint utilizing mirror surfaces, to thereby fill up fine irregularities on the matrix surfaces of the mirror surface joints, thereby extremely enhancing the effects for improving the sealability and electrical joint of joining areas S.

Further, concerning the joint between the holder member 15 and gas separator 13, it is selectable to join them by using a so-called diffusion bonding technique, other than the silver vapor deposition onto the surfaces of joining areas S. In the case of such a technique, substantially no stresses nor gas leak are caused particularly when both materials are the same, thereby improving the reliability.

Incidentally, in this embodiment, the outer shapes of the holder member 15, cell plate 11 and gas separator 13 may be elliptical or polygonal (regular penta- or more polygons) in addition to circular (perfect circle). In this case, that opening of the cell plate 11, through which the holder member 15 is arranged, is to have a shape corresponding to the outer shape of the holder member 15. Further, it is preferable for the holder member 15 to fix the cell plate 11 and gas separator 13 at insides thereof excluding outer peripheries of the cell plate 11 and gas separator 13, particularly at the gravity centers of the faces thereof. Moreover, there can be obtained the best balance for stresses when the above-mentioned outer shapes are perfect circles or regular penta- or more polygons, which are particularly suited for installation into vibratory vehicles.

Second Embodiment

Next, there will be described hereinafter a fuel cell of a second embodiment according to the present invention in detail, mainly with reference to FIG. 12. While the first embodiment has been constituted to exhaust the air as an oxidative gas from the gas supplying conduit 5 at the lower side to the gas exhausting conduit 7 at the upper side in FIG. 1, this second embodiment is mainly differentiated therefrom in that the air supplied to gas supplying holes 73 formed at the centers of holder members 150 is discharged from outer peripheral sides of cell units 10. Thus, the second embodiment will be described by emphasizing such a difference, while using like reference numerals for the identical constitutions and appropriately omitting or simplifying the explanation thereof.

Figure 12:
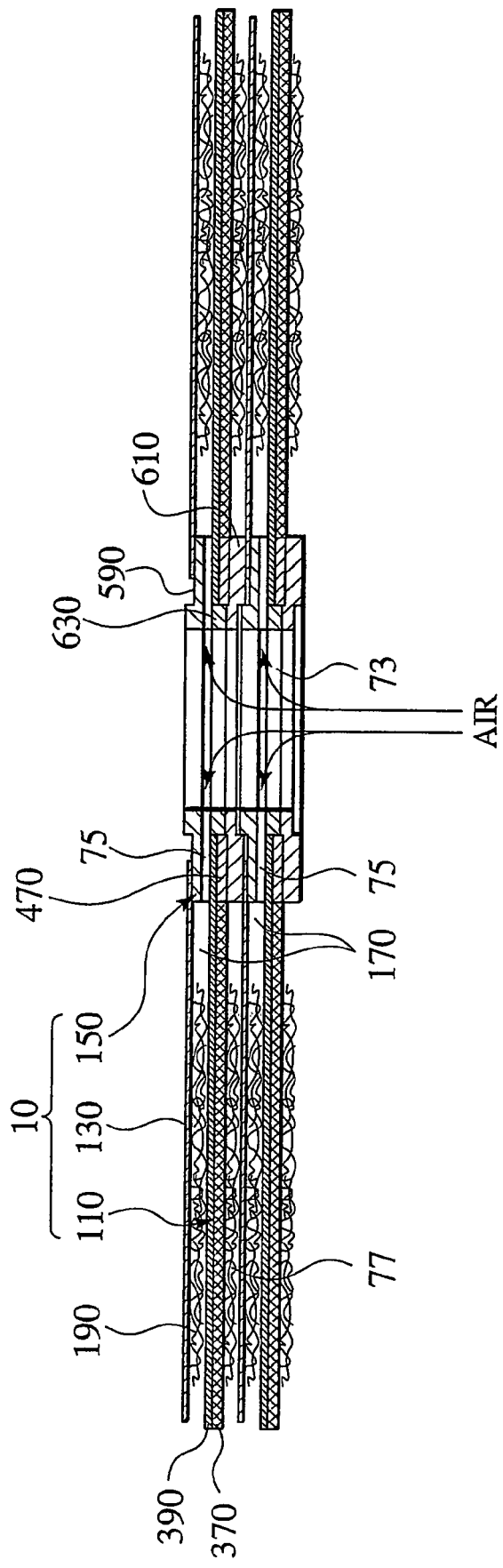
FIG. 12 is a cross-sectional view of a fuel cell stack of a second embodiment according to the present invention, showing a constitution including two stages of cell units of the fuel cell stack.

FIG. 12 is a cross-sectional view of the fuel cell stack of this embodiment, showing a constitution exemplarily including two stages of cell units 10.

As shown in FIG. 12, each cell unit 10 includes a cell plate 110, a gas separator 130 and the holder member 150, similarly to the first embodiment. Filled within a gas passage 170 defined between each cell plate 110 and the associated gas separator 130 is a wool material (porous medium) 190, and so is a wool material (porous medium) 77 between cell units 10, similar to the wool material 190. Note, each cell plate 110 is shown in a simplified manner, as a combination of a porous metal plate 370 and a cell 390.

Similarly to the first embodiment, each holder member 150 comprises an upper electrode part 590, a lower electrode part 610, and an insulating part 630 between both electrode parts 590, 610. Defined between the electrode parts 590, 610 is a gas flow-path 75 for communicating the gas supplying hole 73 with the gas passage 170, while the outer periphery of the cell plate 110, i.e., the outer peripheral side of the gas passage 170 is not closed but opened to the exterior. The gas supplying hole 73 and gas flow-path 75 cooperatively constitute a gas supplying passage for supplying the gas to the associated gas passage 170.

In the above constitution, the air as an oxidative gas is supplied to the gas supplying holes 73 formed at the centers of the holder members 150, flowed through the gas flow-paths 75 and gas passages 170, and then discharged from the outer peripheral side of the cell units 10.

Meanwhile, hydrogen gas acting as a fuel gas is supplied as an ambient gas into the casing accommodating the fuel cell stack therein, similarly to the first embodiment.

Provided at an inner peripheral side of the porous metal plate 370 of each cell plate 110 is a bulk member 470, and the portion of the cell plate 110 corresponding to the bulk member 470 is held by the associated holder member 150.

Also in the constitution of this embodiment, part of each cell plate 110 is held by the associated holder member 150, so that the holding force by the holder member 150 never largely affects on the associated cell 390 including its solid electrolyte layer, thereby allowing to exclude disadvantageous affection onto the solid electrolyte layer.

Further, each cell plate 110 has a fixed central portion and an outer peripheral side unfixed to the associated gas separator 130, so that the cell plate 110 is noway applied with a disadvantageous radial stress, thereby providing higher resistances such as against stress and thermal shock, than the first embodiment.

Moreover, each wool material 77 to be inserted between cell units 10 is capable of absorbing that vibration of the gas separator 130 having its unfixed outer periphery which may be caused by the ambient gas flow. Additionally, electric connection resistances between respective cell units 10 can be also reduced by the associated wool materials 77, respectively.

Incidentally, the wool materials 77 to be inserted between respective cell units 10 can be applied to the first embodiment, thereby reducing the electric connection resistances between respective cell units 10.

Third Embodiment

Next, there will be described hereinafter a fuel cell of a third embodiment according to the present invention in detail, mainly with reference to FIG. 13. This third embodiment is mainly differentiated from the second embodiment in that the third embodiment is constituted such that hydrogen gas as a fuel gas is supplied to a fuel supplying channel 79 provided at a center of a holder member 150A, then through a fuel gas passage 250A under each cell plate 110A, and then discharged from an outer peripheral side of a cell unit 10A, similarly to air as an oxidative gas. Thus, the third embodiment will be described by emphasizing such a difference, while using like reference numerals for the identical constitutions and appropriately omitting or simplifying the explanation thereof.

Figure 13:
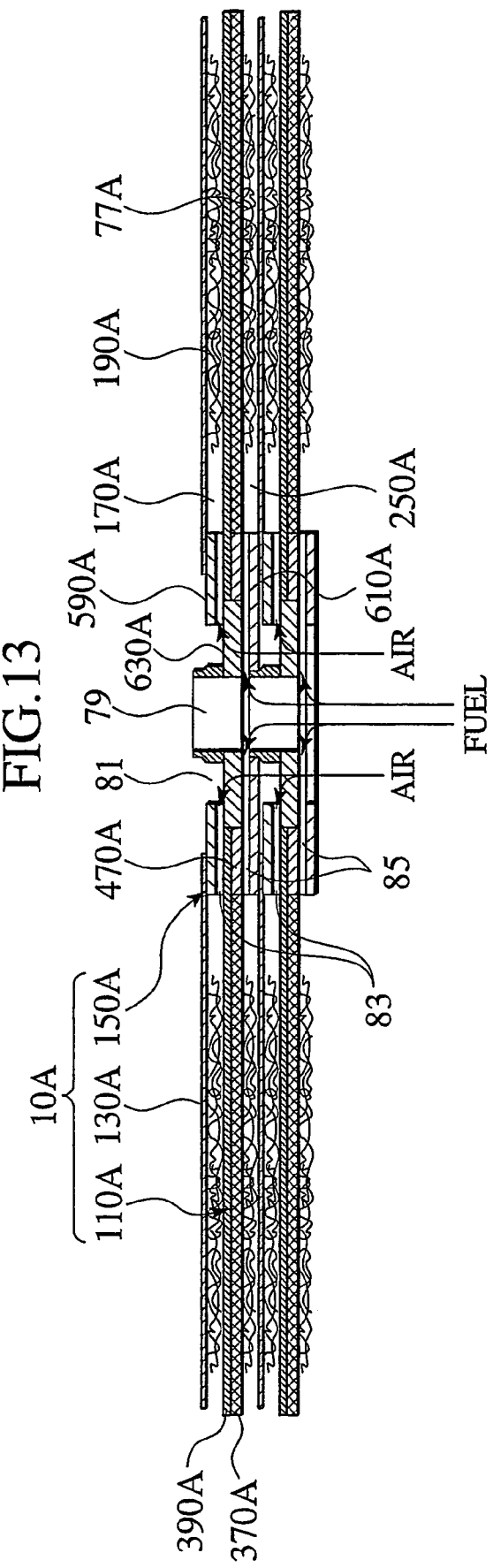
FIG. 13 is a cross-sectional view of a fuel cell stack of a third embodiment according to the present invention, showing a constitution including two stages of cell units of the fuel cell stack.

FIG. 13 is a cross-sectional view of the fuel cell stack of this embodiment, showing a constitution exemplarily including two stages of cell units 10A.

As shown in FIG. 13, each cell unit 10A includes a cell plate 110A, a gas separator 130A and a holder member 150A, similarly to the first embodiment. Filled within a gas passage 170A defined between each cell plate 110A and the associated gas separator 130A is a wool material (porous medium) 190A, and so is a wool material (porous medium) 77A between cell units 10A, similar to the wool material 190A. Note, each cell plate 110A is shown in a simplified manner, as a combination of a porous metal plate 370A and a cell 390A.

Similarly to the first embodiment, each holder member 150A comprises an upper electrode part 590A, a lower electrode part 610A, and an insulating part 630A between both electrode parts 590A, 610A.

Defined between the electrode parts 590A, 610A is a gas flow-path 83 for communicating an air supplying path 81 with a gas passage 170A, while the outer periphery of the cell plate 110A, i.e., the outer peripheral side of the gas passage 170A is not closed but opened to the exterior. Separately defined between the electrode parts 590A, 610A is a fuel gas flow-path 85 for communicating the fuel supplying channel 79 with the fuel gas passage 250A, while the outer periphery of the gas separator 130A, i.e., the outer peripheral side of the fuel gas passage 250A is not closed but opened to the exterior.

The air supplying path 81 and gas flow-path 83 cooperatively constitute a first gas supplying passage for supplying air to the associated gas passage 170A. Further, the fuel supplying channel 79 and fuel gas flow-path 85 cooperatively constitute a second gas supplying passage for supplying the hydrogen gas to the associated fuel gas passage 250A.

In the above constitution, the hydrogen gas as a fuel gas is supplied through the fuel supplying channel 79 provided at the centers of holder members 150A, flowed through fuel gas flow-paths 85 to each fuel gas passage 250A defined between an upper side of the gas separator 130A of one cell unit 10A and a lower side of the upper cell plate 110A, and then discharged from an outer periphery of the fuel gas passage 250A.

Meanwhile, air as an oxidative gas is supplied through air supplying paths 81 provided outside the fuel supplying channel 79, to the respective gas passages 170A at upper sides of the cell plates 110A, and then discharged from outer peripheries of the respective gas passages 170A.

Provided at an inner peripheral side of each porous metal plate 370A is a bulk member 470A, and the portion of the cell plate 110A corresponding to the bulk member 470A is held by the associated holder member 150A.

Also in the constitution of this embodiment, part of each cell plate 110A is held by the associated holder member 150A, so that the holding force by the holder member 150A never largely affects on the associated cell 390A including its solid electrolyte layer, thereby allowing to exclude disadvantageous affection onto the solid electrolyte layer.

Similarly to the second embodiment, it is enough to provide one gas separator 130A for each cell unit 10A, to thereby establish such a simplified structure that both of air and fuel gas required for electric-power generation by the fuel cell stack are allowed to be forcibly supplied from the central holder members 150A, thereby facilitating the operational control concerning gas flow control.

Moreover, each wool material 77A inserted between one cell plate 110A and a gas separator 130A of the neighboring cell unit 10A allows to reduce the electric connection resistance between the cell units 10A.

Fourth Embodiment

Next, there will be described hereinafter a fuel cell of a fourth embodiment according to the present invention in detail, mainly with reference to FIG. 14. This fourth embodiment is similar to the third embodiment in that the fourth embodiment is constituted such that hydrogen gas as a fuel gas is supplied to a fuel supplying channel 79B provided at the centers of holder members 150B, then through a fuel gas passage 250B under each cell plate 110B, and then discharged from an outer peripheral side of a cell unit 10B similarly to air as an oxidative gas. However, the fourth embodiment is mainly differentiated from the third embodiment, in the provided number of gas separators 130B. Thus, the fourth embodiment will be described by emphasizing such a difference, while using like reference numerals for the identical constitutions and appropriately omitting or simplifying the explanation thereof.

Figure 14:
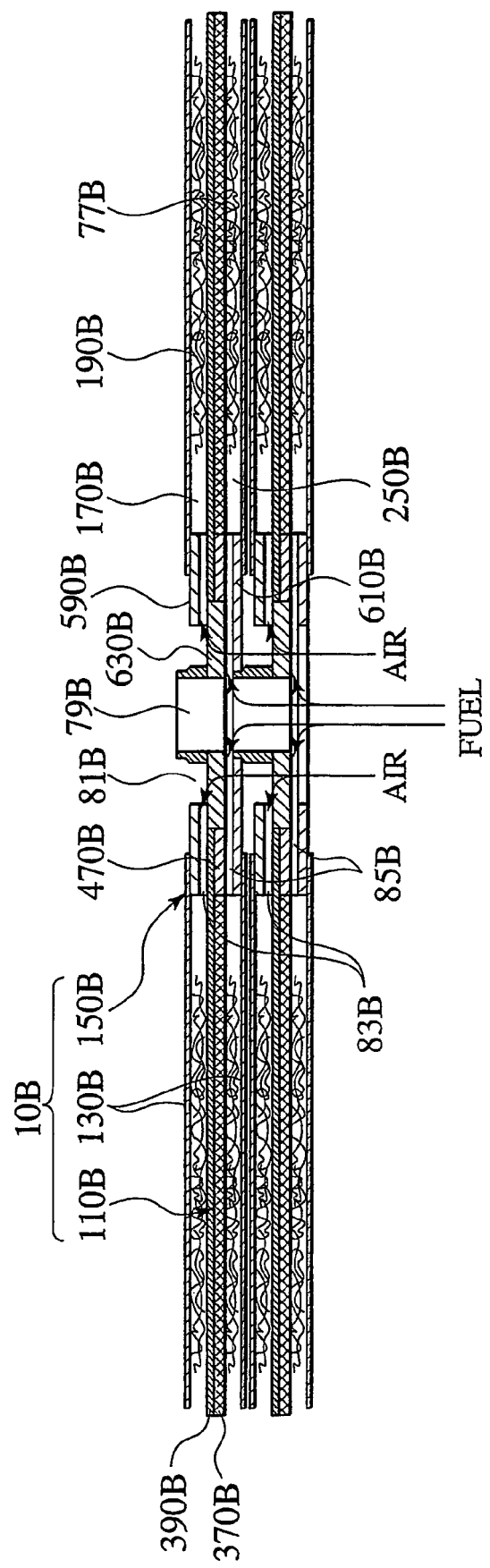
FIG. 14 is a cross-sectional view of a fuel cell stack of a fourth embodiment according to the present invention, showing a constitution including two stages of cell units of the fuel cell stack.

FIG. 14 is a cross-sectional view of the fuel cell stack of the fourth embodiment, showing a constitution exemplarily including two stages of cell units 10B.

As shown in FIG. 14, each cell unit 10B includes a cell plate 110B, gas separators 130B and a holder member 150B, similarly to the first embodiment. The gas separators 130B is comprised of totally two gas separators provided at the topmost and lowermost of each cell unit 10B, respectively. Filled within a gas passage 170B defined between each cell plate 110B and the associated one gas separator 130B is a wool material (porous medium) 190B, and so is a wool material (porous medium) 77B between cell units 10B, similar to the wool material 190B. Note, each cell plate 110B is shown in a simplified manner, as a combination of a porous metal plate 370B and a cell 390B.

Similarly to the first embodiment, each holder member 150B comprises an upper electrode part 590B, a lower electrode part 610B, and an insulating part 630B between both electrode parts 590B, 610B.

Defined between the electrode parts 590B, 610B is a gas flow-path 83B for communicating an air supplying path 81B with a gas passage 170B, while the outer periphery of the cell plate 110B, i.e., the outer peripheral side of the gas passage 170B is not closed but opened to the exterior. Separately defined between the electrode parts 590B, 610B is a fuel gas flow-path 85B for communicating the fuel supplying channel 79B with the fuel gas passage 250B, while the outer periphery of the gas separator 130B, i.e., the outer peripheral side of the fuel gas passage 250B is not closed but opened to the exterior.

The air supplying path 81B and gas flow-path 83B cooperatively constitute a first gas supplying passage for supplying air to the associated gas passage 170B. Further, the fuel supplying channel 79B and fuel gas flow-path 85B cooperatively constitute a second gas supplying passage for supplying the hydrogen gas to the associated fuel gas passage 250B provided under the cell plate 110B.

In the above constitution, the hydrogen gas as a fuel gas is supplied through the fuel supplying channel 79B provided at the centers of holder members 150B, flowed through fuel gas flow-paths 85B to fuel gas passages 250B at lower sides of the cell plates 110B, and then discharged from outer peripheries of the fuel gas passage 250B.

Incidentally, air as an oxidative gas is supplied through air supplying paths 81B provided outside the fuel supplying channel 79B, to the gas passages 170B at upper sides of the cell plates 110B, and then discharged from outer peripheries of the respective gas passages 170B.

Provided at an inner peripheral side of each porous metal plate 370B is a bulk member 470B, and the portion of the cell plate 110B corresponding to the bulk member 470B is held by the associated holder member 150B.

Also in the constitution of this embodiment, part of each cell plate 110B is held by the associated holder member 150B, so that the holding force by the holder member 150B never largely affects on the associated cell 390B including its solid electrolyte layer, thereby allowing to exclude disadvantageous affection onto the solid electrolyte layer.

Further, the gas separators 130B are provided at both surfaces of each cell plate 110B, respectively, and the outer peripheral sides of the gas separators 130B are not fixed, so that the cell plate 110B is not applied with any stress except from the cell plate 110B itself with the best balance as compared with the first through third embodiments, while achieving a well-balanced thermal conduction between the obverse and reverse sides of each cell plate 110B.

Incidentally, in a case where the electrical joint between electric-power generating regions of neighboring cell units in the first embodiment can be alternatively ensured by providing the wool material (porous medium) of lower resistance described in the second through fourth embodiments, the ring 71 is unrequited and then it is possible to adopt such a constitution that the holder member itself is previously fabricated by integral formation from an electrically insulative material such as ceramics and that the gas separator is superposed onto such a holder member. Such a constitution enables to reduce the number of parts of each holder member, thereby achieving a reduced cost.

Further, in the fourth embodiment, the electrical joint between neighboring cell units 10B shown in FIG. 14 may also be achieved between gas separators 130B themselves, and the holder member can also be fabricated by integral formation of ceramics in such a case.

The entire content of a Patent Application No. TOKUGAN 2002-374452 with a filing date of Dec. 25, 2002 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

INDUSTRIAL APPLICABILITY

As described above, the fuel cell according to the present invention comprises: a cell plate provided with a supporting body, and a cell formed on the supporting body; an electroconductive gas separator which cooperates with the cell plate to define a gas passage; and a holder member holding a part of the cell plate. The cell includes a solid electrolyte, a cathode substance layer formed on one surface of the solid electrolyte, and an anode substance layer formed on the other surface of the solid electrolyte. According to such a constitution, the holding force by the holder member never acts largely on the cell including the solid electrolyte, thereby allowing to exclude disadvantageous affection onto the solid electrolyte, and enabling to realize a fuel cell of a higher reliability, so that the applicability can be expected widely including a fuel cell powered vehicle.

The invention claimed is:

1. A fuel cell comprising:
a plurality of cell units stacked in a stacking direction with the cell units comprising:
a cell plate provided with:
a supporting body including a porous metal plate;
a cell formed on the supporting body, the cell including a solid electrolyte layer, a cathode substance layer formed on one surface of the solid electrolyte layer, and an anode substance layer formed on the other surface of the solid electrolyte layer; and an inner annular bulk metal member which is a gas impermeable member radially next to and fixed to the porous metal plate;

an electroconductive gas separator which cooperates with the cell plate, to form a gas passage; and a holder member clamping the inner annular bulk metal member in combination with a holder member of an adjacent cell unit, apart from the porous metal plate.

2. The fuel cell of claim 1, wherein the holder member further holds a part of the gas separator.

3. The fuel cell of claim 1, wherein the plurality of cell units is mutually electrically connected to one another to thereby constitute a stack.

4. The fuel cell of claim 3, wherein a fastening force is applied to a portion within the holder member of each cell unit of the stack, as a main portion to which the fastening force is applied.

5. The fuel cell of claim 4, wherein a compressive force, in the stacking direction, due to the fastening force is applied at least to the cell plate and the electroconductive gas separator of each cell unit of the stack.

6. The fuel cell of claim 1, wherein an insulating member is provided on the annular bulk metal member, and the annular bulk metal member and the insulating member respectively have the same thermal expansion coefficients as that of the solid electrolyte layer.

7. The fuel cell of claim 1, wherein the holder member is provided with a gas supplying passage supplying a gas to the gas passage.

8. The fuel cell of claim 1, wherein the gas separator is provided to oppose one side of the cell plate so as to form the gas passage while closing an outer peripheral side of the gas passage, and wherein the holder member is provided with a gas supplying passage for supplying a gas to the gas passage and with a gas exhausting passage for exhausting the gas from the gas passage such that a first gas is supplied from the gas supplying passage to the gas passage.

9. The fuel cell of claim 1, wherein the gas separator is provided to oppose one side of the cell plate so as to form the gas passage while opening an outer peripheral side of the gas passage, and wherein the holder member is provided with a gas supplying passage for supplying a gas to the gas passage such that a first gas is supplied from the gas supplying passage to the gas passage and exhausted from the outer peripheral side of the gas passage.

10. The fuel cell of claim 1, wherein the gas separator is provided to oppose one side of the cell plate so as to form the gas passage as a first gas passage while opening an outer peripheral side of the first gas passage, wherein the cell plate of a given cell unit cooperates with a gas separator of a neighboring cell unit to thereby form a second gas passage therebetween while opening an outer peripheral side of the second gas passage, and wherein the holder member is provided with a first gas supplying passage for supplying a first gas to the first gas passage and with a second gas supplying passage for supplying a second gas to the second gas passage such that the first gas is supplied to the first gas passage through the first gas supplying passage and is exhausted from the outer peripheral side of the first gas passage, and the second gas is supplied to the second gas passage through the second gas supplying passage and exhausted from the outer peripheral side of the second gas passage.

11. The fuel cell of claim 1, wherein the gas separator comprises a first gas separator and a second gas separator provided to oppose one side and the other side of the cell plate so as to form the gas passage as a first gas passage and a second gas passage, respectively, while opening an outer peripheral side of the first gas passage and an outer peripheral side of the second gas passage, and wherein the holder member is provided with a first gas supplying passage for supplying a first gas to the first gas passage and with a second gas supplying passage for supplying a second gas to the second gas passage such that the first gas is supplied to the first gas passage through the first gas supplying passage and is exhausted from the outer peripheral side of the first gas passage, and the second gas is supplied to the second gas passage through the second gas supplying passage and exhausted from the outer peripheral side of the second gas passage.

12. The fuel cell of claim 1, wherein the holder member includes a first member arranged at one side of the cell plate and having electroconductivity, a second member arranged at the other side of the cell plate and having electroconductivity, and an electrically insulative material joining the first member to the second member.

13. The fuel cell of claim 3, wherein the gas separator is provided at one side of the cell plate, the holder member is made of an electrically insulative material, and an electric conductor is provided between neighboring cell units so as to electrically connect the neighboring cell units to each other.

14. The fuel cell of claim 3, wherein the gas separator is provided at each of one side and the other side of each cell plate, wherein the holder member is made of an electrically insulative material, and wherein the gas separator of each cell unit is mutually electrically connected to the gas separator of a neighboring cell unit.

15. The fuel cell of claim 1, wherein the holder member and the gas separator are made of the same material and are joined to each other by diffusion bonding.

16. The fuel cell of claim 1, wherein mutual contacting areas of the holder member, gas separator and cell plate are formed into mirror surfaces, respectively.

17. The fuel cell of claim 1, wherein mutual contacting areas of the holder member, gas separator and cell plate are formed with thin films, respectively, having a low hardness and a low electrical resistance.

18. The fuel cell of claim 3, wherein the stack is elastically held within a casing.

19. The fuel cell of claim 1, wherein the holder member is arranged in a hole provided at a central portion of the cell plate.

20. The fuel cell of claim 1, wherein the holder member and cell plate have circular or polygonal outer shapes, respectively.

21. The fuel cell of claim 1, wherein the holder member is a distinct and different element from the cell plate.

22. The fuel cell of claim 1, wherein the holder member is a distinct and different element from the electroconductive gas separator.

23. The fuel cell of claim 1, wherein the holder member, the electroconductive gas separator, and the cell plate are distinct and different elements from each other.

* * * * *